(12) United States Patent
Zhu et al.

(10) Patent No.: US 8,326,593 B1
(45) Date of Patent: Dec. 4, 2012

(54) AMPLITUDE MODULATION-PHASE MODULATION DECOMPOSITION METHOD FOR PHASE NOISE SIMULATION OF OSCILLATORS WITH LARGE TIME-CONSTANT

(75) Inventors: Yu Zhu, Campbell, CA (US); Xiaolue Lai, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 225 days.

(21) Appl. No.: 12/786,747

(22) Filed: May 25, 2010

(51) Int. Cl.
*G06F 17/50* (2006.01)
(52) U.S. Cl. .......................... 703/14; 708/804
(58) Field of Classification Search .................. 703/3, 4, 703/14; 708/804
See application file for complete search history.

(56) References Cited

U.S. PATENT DOCUMENTS

| 6,349,272 | B1 * | 2/2002 | Phillips | 703/14 |
| 6,636,839 | B1 * | 10/2003 | Telichevesky et al. | 703/4 |
| 6,798,303 | B2 * | 9/2004 | Steinecke et al. | 331/78 |
| 7,007,253 | B2 * | 2/2006 | Gullapalli et al. | 716/115 |
| 7,332,974 | B1 * | 2/2008 | Mehrotra et al. | 703/14 |
| 7,853,910 | B1 * | 12/2010 | Zhu et al. | 703/16 |

OTHER PUBLICATIONS

Mehrota., "Simulation and Modelling Techniques for Noise in Radio Frequency Integrated Circuits"., Fall 1999., University of California at Berkeley., 181 Pges.*
Cadence., "Vituoso Spectra Circuit Simulator RF Analysis User Guid.", Jun. 2007, 206 Pages.*
Telichevesk, R., et al., "Efficient AC and Noise Analysis of Two-tone RF Circuits," Proceedings of the 33rd annual ACM IEEE Design Automation Conference, 1996, pp. 292-297.
Demir, A., et al., "Phase Noise in Oscillators: a Unifying Theory and Numerical Methods for Characterization," IEEE Transactions on Circuits and Systems—I: Fundamental Theory and Applications, May 2000, pp. 655-674, vol. 47 No. 5.

* cited by examiner

*Primary Examiner* — Eunhee Kim
(74) *Attorney, Agent, or Firm* — Kilpatrick Townsend & Stockton LLP (57) ABSTRACT

Embodiments may include methods, systems, and computer-readable storage mediums that may be used to simulate phase noise for an oscillator circuit. In some embodiments, a method of simulating phase noise for an oscillator circuit may include providing an oscillator circuit description. A time-domain representation of a small signal phase noise of the oscillator circuit description may be determined. A shooting Newton matrix representation of the time-domain representation of the small signal phase noise may be generated. The shooting Newton matrix representation may be augmented to include a phase-shift factor and a pinning equation. The augmented shooting Newton matrix representation may be solved to determine a signal output of the oscillator circuit.

24 Claims, 6 Drawing Sheets

AMPLITUDE MODULATION-PHASE MODULATION DECOMPOSITION METHOD FOR PHASE NOISE SIMULATION OF OSCILLATORS WITH LARGE TIME-CONSTANT

BACKGROUND

The present invention relates generally to electronic circuit characterization and simulation techniques. More particularly, embodiments provide methods, systems, and computer-readable storage mediums for determining phase-noise characteristics for circuits having an oscillator.

Accurate oscillator phase-noise characterization may be critical in the design of some RF and microwave communication systems. As IC voltage references, such as bandgap references for example, are widely used as DC biasing circuitry in deep-submicron low noise RF oscillator design because of its insensitivity to temperature and load variations, the phase noise at low offset frequency can be dominated by the thermal and flicker noises generated by the voltage reference.

Some methods of phase noise analysis may involve time-domain methods, such as shooting Newton method. Merely by way of example, a procedure of the shooting Pnoise analysis may involve the following: 1) Assemble a matrix to compute a transfer function; 2) because the matrix equation may be close to singular for small offset-frequency, the dominant mode (whose eigen-value is zero) may be extracted; 3) separate the solution to the matrix equation into two parts—the part in parallel with the dominant mode and the part vertical to the dominant mode; and solve them separately; and 4) combine the two parts together into the solution to the matrix equation.

This shooting-Pnoise method may work well for some circuits. However, there may exist an increasingly large number of oscillators on which the shooting-Pnoise may fail or give wrong phase-noise results. There may be different categories of the problems. For example, the shooting-Pnoise may fail to extract a unique dominant mode. Even if the dominant mode is extracted, the calculated phase-noise may fail to include the noise contribution from a voltage supply, for example. The low-frequency noise from voltage supply may be up-converted to the first harmonics and may show a hump at small offset frequency. However, the shooting-Pnoise may not capture this behavior.

The cause of both problems may be because the algorithm of the shooting-Pnoise is not valid for some oscillators, for example, oscillators with voltage supply of large time-constant. The assumption that the solution can be separated completely using a frequency-independent eigen-mode may be wrong in these cases.

There is thus a need for tools and techniques that provide a robust and accurate approach to simulate the phase-noise, especially to compute noise contribution due to the voltage supply with large time-constant.

BRIEF SUMMARY

Embodiments may thus provide tools and techniques that may include robust and accurate approaches to simulate phase-noise. In particular, some embodiments may provide accurate simulation of noise contributions due to large time-constant sources, such as voltage supplies.

Embodiments may involve a modified perturbation projection vector method that may enhance the Pnoise analysis for oscillators. Embodiments may utilize a time-domain approach. Some embodiments may involve the following procedure. A matrix may be assembled to represent a description of an oscillator circuit that may then be used to compute a transfer function. The matrix may be augmented with an extra unknown phase shift and an extra equation; the extra equation may be the same as a large-signal pinning equation to pin the phase of a steady state solution. Since the matrix size may be larger by one, a Schur-complement approach may be used to separate the matrix into two equations—an equation on phase modulation and an equation on amplitude modulation. The separation may allow for the use of the Arnoldi-vector recycle technique to speed up the matrix solving. A solution may be determined by combining the two equations.

Embodiments may provide several advantages. Some embodiments do not involve extracting a dominant eigen-mode. As a result, embodiments may not result in any computational cost and/or confusion of choosing a unique dominant eigen-mode. Embodiments may also simulate oscillators with large time-constant correctly. However, the approach may simulate other oscillators correctly as well. Embodiments may also use the Arnoldi-vector recycle technique, so there may be no sacrifices in performance.

Some embodiments may include a method of simulating phase noise for an oscillator circuit. In some embodiments, the method of simulating phase noise for an oscillator circuit may be performed in a circuit simulation tool implemented in a computer system having one or more computer processors and a computer-readable storage medium. The method of simulating phase noise for an oscillator circuit may include providing an oscillator circuit description. The method of simulating phase noise for an oscillator circuit may include determining a time-domain representation of a small signal phase noise of the oscillator circuit description. The method of simulating phase noise for an oscillator circuit may include generating a shooting Newton matrix representation of the time-domain representation of the small signal phase noise. The method of simulating phase noise for an oscillator circuit may include augmenting the shooting Newton matrix representation to include a phase-shift factor and a pinning equation. The method of simulating phase noise for an oscillator circuit may include solving the augmented shooting Newton matrix representation to determine a signal output of the oscillator circuit.

In some embodiments of a method of simulating phase noise for an oscillator circuit, the pinning equation may pin the phase of a large signal steady state solution of the oscillator circuit. Some embodiments may further separate the matrix representation into a phase modulation portion and an amplitude modulation portion. Some embodiments may further include solving the phase modulation portion and the amplitude modulation portion separately. Some embodiments may further include applying an iterative recycle technique to solve at least a portion of the matrix representation. The iterative recycling technique may be an Arnoldi-vector recycle technique.

In some embodiments of a method of simulating phase noise for an oscillator circuit, the oscillator circuit may include a large time-constant element. The large time-constant element may have time-constant value that is more than 100 times larger than the oscillating periods of the oscillator. The large time-constant element may be a voltage supply.

Some embodiments may include a system for simulating phase noise for an oscillator circuit. The system may include a storage medium. The system may include a processor coupled with the storage medium. The processor may be configured to simulate phase noise for an oscillator circuit by a configuration to: provide an oscillator circuit description; determine a time-domain representation of a small signal phase noise of the oscillator circuit description; generate a shooting Newton matrix representation of the time-domain representation of the small signal phase noise; augment the shooting Newton matrix representation to include a phase-shift factor and a pinning equation; and/or solve the augmented shooting Newton matrix representation to determine a signal output of the oscillator circuit.

In some embodiments of a system for simulating phase noise for an oscillator circuit, the pinning equation may pin the phase of a large signal steady state solution of the oscillator circuit. Some embodiments may further separate the matrix representation into a phase modulation portion and an amplitude modulation portion. Some embodiments may further include solving the phase modulation portion and the amplitude modulation portion separately. Some embodiments may further include applying an iterative recycle technique to solve at least a portion of the matrix representation. The iterative recycling technique may be an Arnoldi-vector recycle technique.

In some embodiments a system for simulating phase noise for an oscillator circuit, the oscillator circuit may include a large time-constant element. The large time-constant element may have time-constant value that is more than 100 times larger than the oscillating periods of the oscillator. The large time-constant element may be a voltage supply.

Some embodiments may include a machine-readable storage medium including executable instructions for simulating phase noise for an oscillator circuit. The executable instructions may include code for: providing an oscillator circuit description; determining a time-domain representation of a small signal phase noise of the oscillator circuit description; generating a shooting Newton matrix representation of the time-domain representation of the small signal phase noise; augmenting the shooting Newton matrix representation to include a phase-shift factor and a pinning equation; and/or solving the augmented shooting Newton matrix representation to determine a signal output of the oscillator circuit.

In some embodiments of a machine-readable storage medium including executable instructions for simulating phase noise for an oscillator circuit, the pinning equation may pin the phase of a large signal steady state solution of the oscillator circuit. Some embodiments may further separate the matrix representation into a phase modulation portion and an amplitude modulation portion. Some embodiments may further include solving the phase modulation portion and the amplitude modulation portion separately. Some embodiments may further include applying an iterative recycle technique to solve at least a portion of the matrix representation. The iterative recycling technique may be an Arnoldi-vector recycle technique.

In some embodiments of a machine-readable storage medium including executable instructions for simulating phase noise for an oscillator circuit, the oscillator circuit may include a large time-constant element. The large time-constant element may have time-constant value that is more than 100 times larger than the oscillating periods of the oscillator. The large time-constant element may be a voltage supply.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Embodiments may utilize a time-domain approach. Some embodiments may involve the following procedure. A matrix may be assembled to represent a description of an oscillator circuit that may then be used to compute a transfer function. The matrix may be augmented with an extra unknown phase-shift and an extra equation; the extra equation may be the same as a large-signal pinning equation to pin the phase of a steady state solution. Since the matrix size may be larger by one, a Schur-complement approach may be used to separate the matrix into two equations—a phase modulation equation and an amplitude modulation equation. The separation may allow for the use of the Arnoldi-vector recycle technique to speed up the matrix solving. A solution may be determined by combining the two equations.

Embodiments may provide several advantages. Some embodiments do not involve extracting a dominant eigen-mode. As result, embodiments may not result in any computational cost and/or confusion of choosing a unique dominant eigen-mode. Embodiments may also simulate oscillators with large time-constant correctly. However, the approach may simulate other oscillators correctly. Embodiments may also use the Arnoldi-vector recycle technique, so there may be no sacrifices in performance.

To better understand different embodiments, consider the output spectrum of an actual oscillator. The output spectrum of an actual oscillator may not be in the shape of a delta impulse. Instead, the output spectrum may exhibit the shape of "skirts" around its oscillation frequency due to various noises of its constituent devices and the limited quality factor of its resonant tank. Thus, when a LO signal generated from the oscillator mixes with RF signals on two adjacent channels, for example, the spectra of the two down-converted signals can overlap and the signal on one channel can creep into its neighboring channel. In order to minimize the so called "reciprocal mixing", the skirt of its output spectrum may be made as narrow as possible. The noise around oscillation frequency may be mostly dominated by phase noise due to oscillator's nonlinear amplitude-limiting effect. Thus, the shape of the spectrum can be characterized by a phase-noise simulation.

Figure 1:
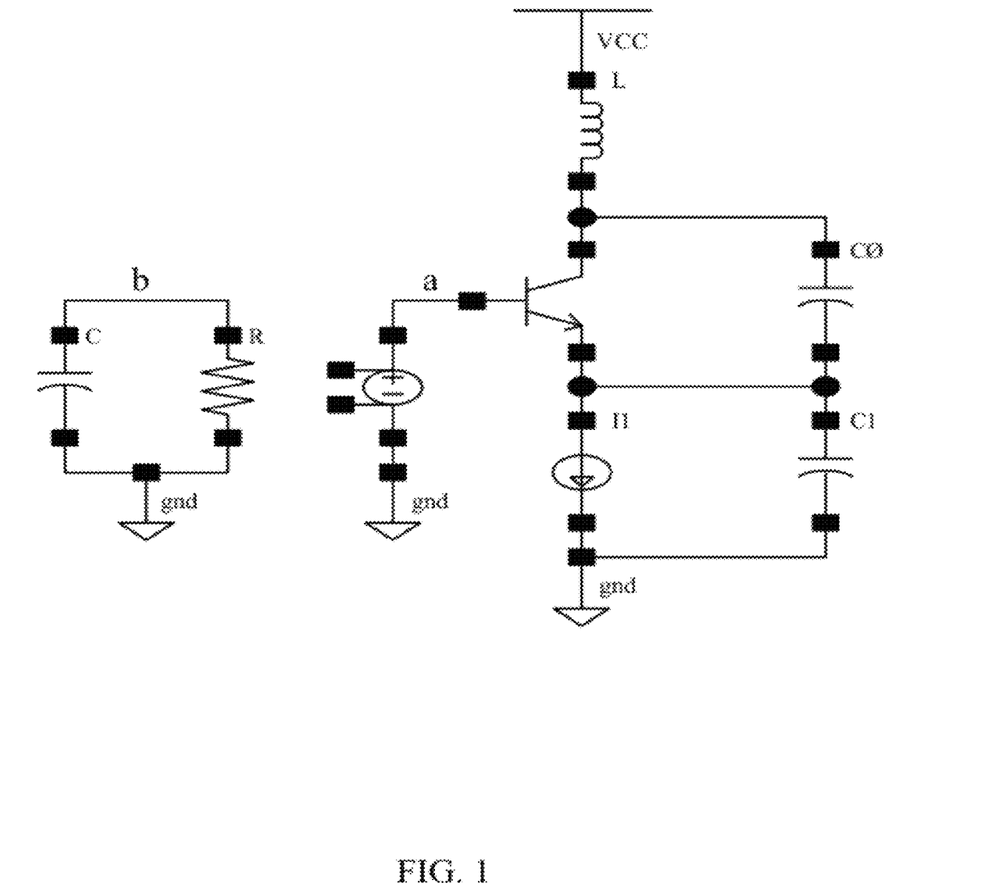
FIG. 1 is a schematic diagram illustrating an oscillator coupled with a large RC network, in accordance with various embodiments.

Mèrely by way of example, consider a large time-constant RC network b, which may emulate a band-gap voltage supply, coupled with the base of the BJT of a Colpitts oscillator a as shown in FIG. 1. Other embodiments may use a variety of different oscillators and may include circuits with a variety of different components; FIG. 1 should not be seen as limiting these possibilities.

Figure 2:
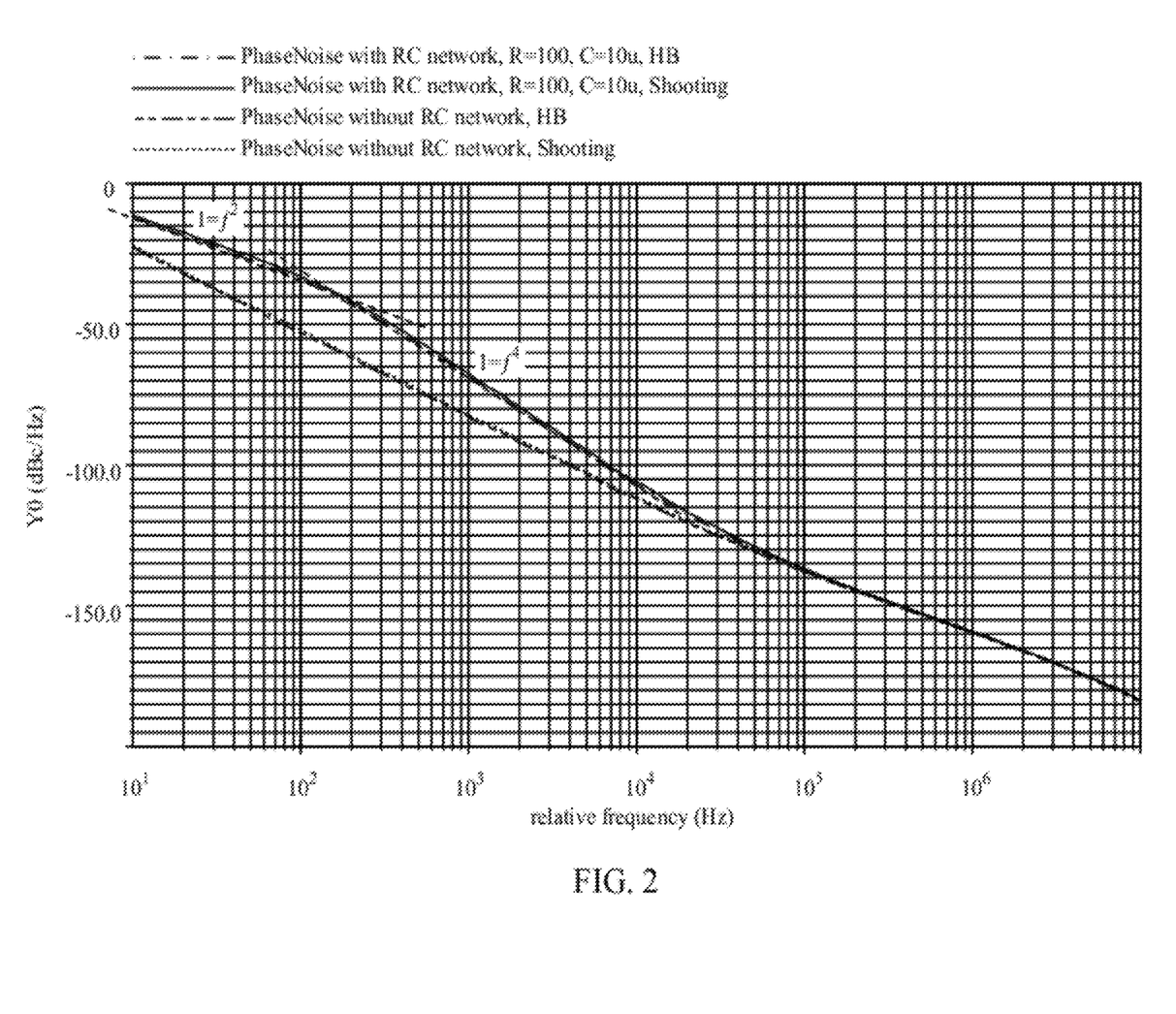
FIG. 2 is a phase-noise diagram illustrating phase-noise curves for an oscillator such as that in FIG. 1, in accordance with various embodiments.

FIG. 2 shows the phase-noise curves of a colpitts oscillator as seen in FIG. 1, for example, around the first harmonics. For the oscillator without the RC network coupled into BJT's base, the phase-noise curve shows a typical shape of $1/f^2$ at large offset frequency where white-noise is dominant and $1/f^3$ at small offset frequency where flicker noise is dominant. However if a RC network with large time-constant is coupled with the oscillator, there may be a hump at the offset frequency around the cut-off frequency $1/RC$. The hump, as seen in FIG. 2, may be caused by the low-frequency thermal noise of RC network, which is up-converted to the first harmonics by the oscillator. To elaborate, the noise power spectrum at node b may be described as:

$$S_b(\omega) = \left\| \frac{R}{1 + j\omega RC} \right\|^2 \frac{KT}{R},$$

where $KT/R$ is the resistor's thermal current noise. Thus, the spectrum may have a low pass filter shape and cut-off frequency that may be represented as $1/RC$. The low-frequency noise may be multiplied with $1/\omega$ due to the integration nature of oscillators; and then up-converted to first harmonics due to the nonlinearity of active device, BJT. The perturbation projection vector (PPV) methods may not predict this behavior, because the analytical phase-noise formula used for some of these may be based on the PPV with the assumption that the time-constant is smaller than an oscillation period. PPV methods are discussed in A. Denmir et al. "Phase noise in oscillators: a unifying theory and numerical methods for characterization," IEEE Trans. Circuits and Systems. I: Fundamental Theory and Applications 47(5):655-674, May 2000, incorporated by reference herein for all purposes. Embodiments utilizing a modified shooting Newton method may predict the hump correctly.

Figure 3:
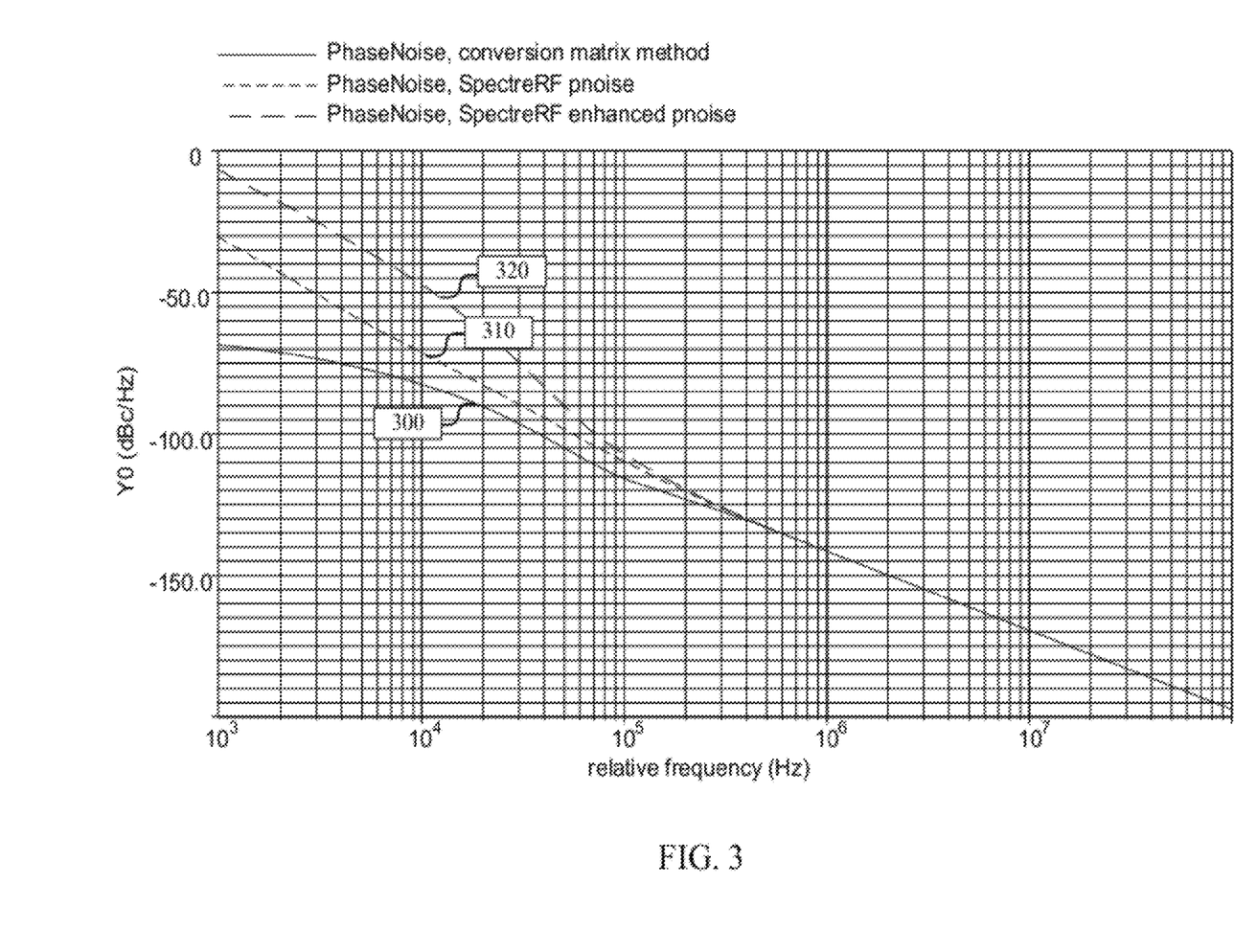
FIG. 3 is a phase-noise diagram comparing several different methods of modeling phase noise for an oscillator circuit, in accordance with various embodiments.

FIG. 3 provides of a low-power high-performance differential CMOS oscillator for LO generation. LO phase noise may be of critical importance to the receiver performance. Bandgap reference noise coupling in through the voltage regulator may be a serious concern for VCO phase-noise at 100 kHz offset and below. Three methods are compared: conversion matrix 300, regular PPV 310, and methods in accordance with various embodiments 320. The conversion matrix may show bad results because the matrix may be ill-conditioned at low offset-frequency. The PPV method may fail to include the bandgap noise contribution. The methods in accordance with various embodiments, in contrast, can capture the low frequency noise generated by the bandgap reference as shown in FIG. 3.

Embodiments may utilize a time-domain approach. Some embodiments may involve the following procedure. A matrix may be assembled to compute a transfer function. The matrix may be augmented with an extra unknown on phase-shift and an extra equation; the extra equation may be the same as a large-signal pinning equation to pin the phase of steady state solution. Since the matrix size is larger by one, a Schur-complement approach may be used to separate the matrix into two equations—a phase modulation equation and an amplitude modulation equation. The separation may allow for the use of the Arnoldi-vector recycle technique to speed up the matrix solving. A solution may be determined by combining the two equations.

Embodiments may provide several advantages. Some embodiments do not involve extracting a dominant eigen-mode. As result, embodiments may not result in any computational cost and/or confusion of choosing a unique dominant eigen-mode. Embodiments may also simulate oscillators with large time-constant correctly. However, the approach may simulate other oscillators correctly. Embodiments may also use the Arnoldi-vector recycle technique, so there may be no sacrifices in performance.

Matrix in Shooting-Phase Noise Analysis

In some embodiments, variations on shooting Newton methods may be utilized to simulate phase noise for an oscillator circuit. For example, a small signal equation for shooting-Pnoise may be represented as the following:

$$\frac{d}{dt}(C(t)x(t)) + G(t)x(t) = y(t) \quad (1)$$

where $x(t)$ may represent a response or an oscillator's solution; $y(t)$ may represent a perturbation; $C(t)$ may represent the time-varying dynamic elements, such as capacitors and inductors, in the oscillators; and $G(t)$ may represent the time-varying static elements, such as resistors, in the oscillator. As shown above, Equation (1) may represent a system of equations describing the behavior of a circuit, and $x(t)$ may represent circuit variables, such as node voltages and/or currents in a circuit branch, merely by way of example. In some embodiments, $C(t)$, $G(t)$, and $y(t)$ may be formulated based on a circuit description of the oscillator circuit. For example, a circuit description may be a netlist that can be used as an input to a circuit simulator. Alternatively, a circuit description may be a schematic form, which may be converted by a design entry program into a netlist or other forms acceptable to a circuit simulator. In a circuit simulation tool, a circuit description may be stored in a computer-readable storage medium, which can be retrieved by a processor.

Some embodiments may transform Equation (1) utilizing a shooting Newton method that transforms the ordinary differential equation (ODE) into a nonlinear algebraic matrix equation using a linear time integration scheme. For example, after time discretization, and replacement of the time-derivative with Euler or Gear representation as described, merely by way of example, in R. Telichevesky et al., "Efficient AC and Noise Analysis of Two-Tone RF Circuits," Proceedings of the 33rd annual ACM IEEE Design Automation Conference, 1996, incorporated by reference for all purposes, a matrix equation may be formed represented as:

$$\begin{bmatrix} G(t_1) + \frac{C(t_1)}{h_1} & & & -\alpha \frac{C(t_M)}{h_1} \\ -\frac{C(t_1)}{h_2} & G(t_2) + \frac{C(t_1)}{h_2} & & \\ & \ddots & \ddots & \\ & & -\frac{C(t_M-1)}{h_M} & G(t_M) + \frac{C(t_1)}{h_M} \end{bmatrix} \begin{bmatrix} x(t_1) \\ x(t_2) \\ \vdots \\ x(t_M) \end{bmatrix} = \begin{bmatrix} y(t_1) \\ y(t_2) \\ \vdots \\ y(t_M) \end{bmatrix} \quad (2)$$

where $\alpha = e^{-j\omega_s T}$ and $\omega_s$ is the small signal frequency. Matrix Equation (2) may be rewritten as $$(L+\alpha B)x = y \quad (3)$$

where $$L = \begin{bmatrix} G(t_1) + \frac{C(t_1)}{h_1} & & & \\ -\frac{C(t_1)}{h_2} & G(t_2) + \frac{C(t_1)}{h_2} & & \\ & \ddots & \ddots & \\ & & -\frac{C(t_M-1)}{h_M} & G(t_M) + \frac{C(t_1)}{h_M} \end{bmatrix}, \quad (4)$$

$$B = \begin{bmatrix} -\frac{C(t_M)}{h_1} \\ \end{bmatrix},$$

Add an Extra Unknown and Extra Equation

In some embodiments, solving for x(t) may involve solving an equation such as the following:

$$(I+\alpha L^{-1}B)x = L^{-1}y \quad (5)$$

The matrix of Equation (5) may be singular because $L^{-1}B$ has one eigen-value equal to $-1$, and $\alpha \to 1$ as $\omega_s \to 0$. An eigenvector of $L^{-1}B$ from the time-derivative of steady state solution may be determined from:

$$L^{-1}BV_r = -V_r \quad (6)$$

where $V_r$ is a known time-derivative of a steady state solution. A solution for x may be rewritten in the following form:

$$x = \frac{\gamma'}{1-\alpha} V_r + x' \quad (7)$$

In some embodiments, the first portion of Equation (7) may represent a phase modulation portion of the equation while the second portion of Equation (7) may represent an amplitude modulation portion of the equation. $\gamma'$ may represent an additional unknown phase shift.

Substituting Equation (7) into Equation (5) along with adding one extra equation, such as $p^T x'=0$, may result in the following:

$$\underbrace{\begin{bmatrix} I+\alpha L^{-1}B & V_r \\ p^T & 0 \end{bmatrix}}_{A} \begin{bmatrix} x' \\ \gamma' \end{bmatrix} = \begin{bmatrix} L^{-1}y \\ 0 \end{bmatrix} \quad (8)$$

The extra equation, such as $p^T x'=0$, may be the same as a pinning equation found with a large-signal pinning equation that may pin the phase of a steady state solution. For example, the pinning equation may be a pinning equation that may be used in shooting Periodic Steady State analysis. Thus, for example, if the k-th node of the last time-point is pinned at zero, then p may be a zero vector, except for the item corresponding to the k-th node of the last time-point, which may be 1.

Equation Separation

An output for the system may be represented as:

$$z = q^T x = \frac{1}{1-\alpha} \gamma' (q^T V_r) + q^T x' \quad (9)$$

where q may be a selector vector and where again the first portion may represent a phase modulation portion and the second portion may represent an amplitude modulation portion. Substitute and rewriting may result in the following equations:

$$z = q^T x = \frac{1}{1-\alpha} \gamma' (q^T V_r) + q^T x' = \quad (10)$$

$$\frac{1}{1-\alpha} (q^T V_r)[0, \ldots, 0\ 1] A^{-1} \begin{bmatrix} L^{-1}b \\ 0 \end{bmatrix} + q^T A^{-1} \begin{bmatrix} L^{-1}y \\ 0 \end{bmatrix} =$$

$$\frac{1}{1-\alpha} \underbrace{[0, \ldots, 0\ (q^T V_r)] A^{-1} \begin{bmatrix} L^{-1}y \\ 0 \end{bmatrix}}_{[x''\ y'']} + \underbrace{q^T A^{-1} \begin{bmatrix} L^{-1}y \\ 0 \end{bmatrix}}_{[x'''\ y''']^T} =$$

$$\underbrace{\left[\frac{1}{1-\alpha} x'' + x'''\right]^T L^{-1} y}_{transfer function}$$

The transfer function may be separated into two parts, a phase modulation part and an amplitude modulation part.

A phase modulation part of the equation may be represented as:

$$\underbrace{\begin{bmatrix} I+\alpha B^T L^{-T} & p \\ V_r^T & 0 \end{bmatrix}}_{A} \begin{bmatrix} x'' \\ y'' \end{bmatrix} = \begin{bmatrix} 0 \\ q^T V_r \end{bmatrix} \to x'' = \quad (11)$$

$$(I+\alpha B^T L^{-T})^{-1} p \left( \frac{q^T V_r}{V_r^T (I+\alpha B^T L^{-T})^{-1} p} \right)$$

where $(I+\alpha B^T L^{-T})^{-1}p$ may be solved in different ways and used in the equations above and below.

An amplitude modulation part of the equation may be represented as:

$$\underbrace{\begin{bmatrix} I+\alpha B^T L^{-T} & p \\ V_r^T & 0 \end{bmatrix}}_{A}\begin{bmatrix} x''' \\ y''' \end{bmatrix} = \begin{bmatrix} q \\ 0 \end{bmatrix} \rightarrow x''' = (I+\alpha B^T L^{-T})^{-1}\left[q - p\frac{V_r^T q}{V_r^T p}\right] \quad (12)$$

For both the phase modulation seen in Equation (11) and the amplitude modulation part seen in Equation (12), iterative recycle techniques such as Arnoldi-vector recycle techniques may be utilized. Arnoldi-vector recycle techniques are discussed for example in R. Telichevesky et al., "Efficient AC and Noise Analysis of Two-Tone RF Circuits," Proceedings of the 33rd annual ACM IEEE Design Automation Conference, 1996, incorporated by reference for all purposes. For example, rather than directly solving Equation (8), the Schur complement may be used to solve $(I+\alpha B^T L^{-T})^{-1}p$, which can use recycle techniques such as Arnoldi-vector recycle techniques.

Some embodiments may thus utilize some or all of the steps discussed above. For example, in some embodiments, a matrix equation such as Equation (5) may be assembled. $(I+\alpha B^T L^{-T})^{-1}p$ may be computed once and used both in the numerator and denominator of Equation (11) to solve x" and a phase modulation component $$\frac{1}{1-\alpha}x''^T L^{-1} y$$

may also be determined. In some embodiments, $(I+\alpha B^T L^{-T})^{-1}p$ may also be used in Equation (12) to compute the x'''. In some embodiments, $$\left[q - p\frac{V_r^T q}{V_r^T p}\right]$$

may be computed and then may be used to solve $$(I+\alpha B^T L^{-T})^{-1}\left[q - p\frac{V_r^T q}{V_r^T p}\right]$$

of Equation (12) to determine x''', from which an amplitude modulation component $x'''^T L^{-1} y$ may be determined. In some embodiments, $(I+\alpha B^T L^{-T})^{-1}p$ may also be used in Equation (12) to compute the x'''. With both the phase modulation component and the amplitude modulation component, these two components may be combined to get a total output solution z.

Embodiments may thus not need to extract the left eigenfunction of $L^{-1}B$ as is the case for some other known methods. Furthermore, the extra equation may be the same as a pinning equation so that it can simulate the oscillators with large time-constant correctly. Furthermore, directly solving the augmented matrix of Equation (8) may be avoided in some embodiments. Some embodiments may utilize a Schur complement to solve $(I+\alpha B^T L^{-T})^{-1}p$, which may use the Arnoldi-vector recycle technique.

Figure 4:
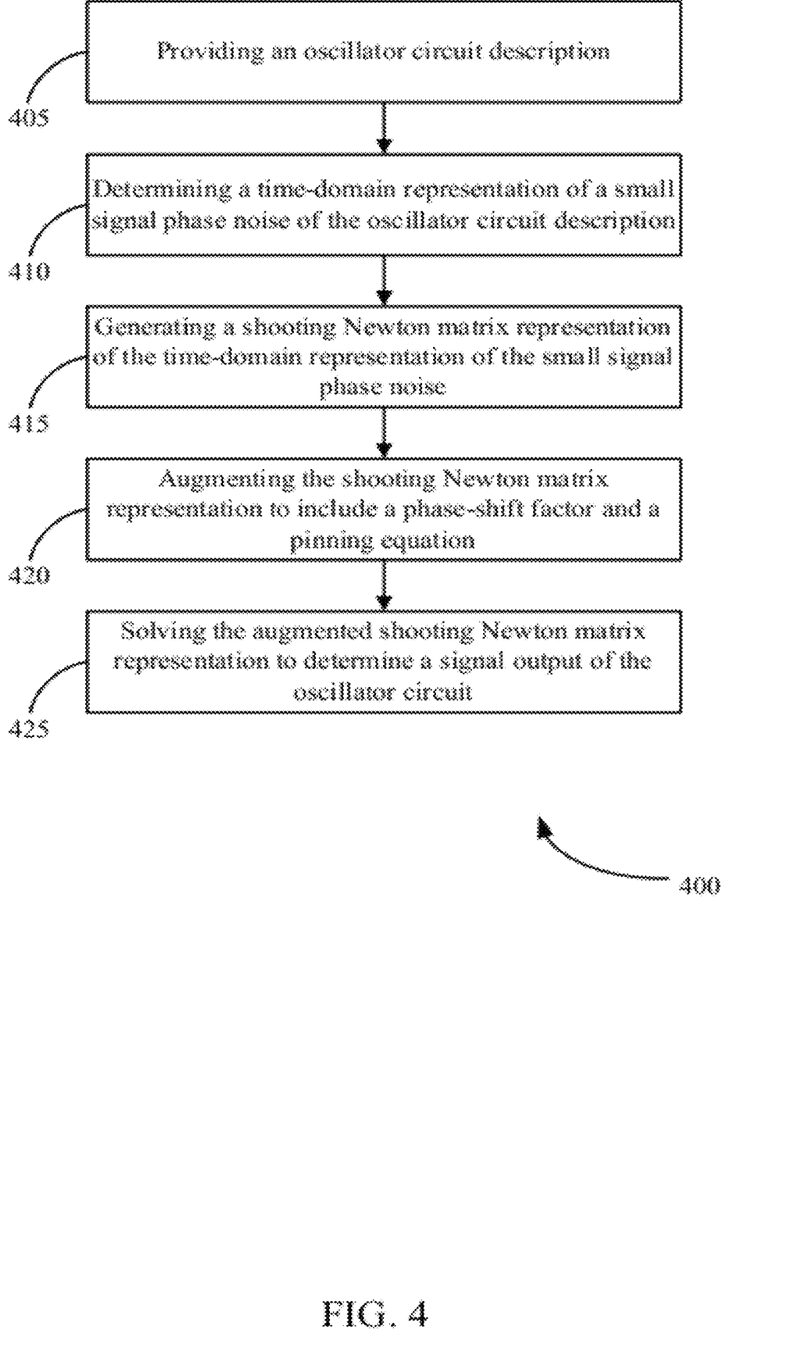
FIG. 4 is a flow chart illustrating a method of simulating phase noise for an oscillator circuit, in accordance with various embodiments.

FIG. 4 provides a method 400 of simulating phase noise for an oscillator circuit in accordance with various embodiments as discussed, for example. In some embodiments, the method of simulating phase noise for an oscillator circuit may be performed in a circuit simulation tool implemented in a computer system having one or more computer processors and a computer-readable storage medium. At block 405, an oscillator circuit description may be provided. At block 410, a time-domain representation of a small signal phase noise of the oscillator circuit description may be determined. At block 415, a shooting Newton matrix representation of the time-domain representation of the small signal phase noise may be generated. At block 420, the shooting Newton matrix representation may be augmented to include a phase-shift factor and a pinning equation. At block 425, the augmented shooting Newton matrix representation to determine a signal output of the oscillator circuit may be solved.

In some embodiments of method 400 of simulating phase noise for an oscillator circuit, the pinning equation may pin the phase of a large signal steady state solution of the oscillator circuit. Some embodiments may further separate the matrix representation into a phase modulation portion and an amplitude modulation portion. Some embodiments may further include solving the phase modulation portion and the amplitude modulation portion separately. Some embodiments may further include applying an iterative recycle technique to solve at least a portion of the matrix representation. The iterative recycling technique may be an Arnoldi-vector recycle technique.

In some embodiments of a method of simulating phase noise for an oscillator circuit, the oscillator circuit may include a large time-constant element. The large time-constant element may have time-constant value that is more than 100 times larger than the oscillating periods of the oscillator. The large time-constant element may be a voltage supply.

Figure 5:
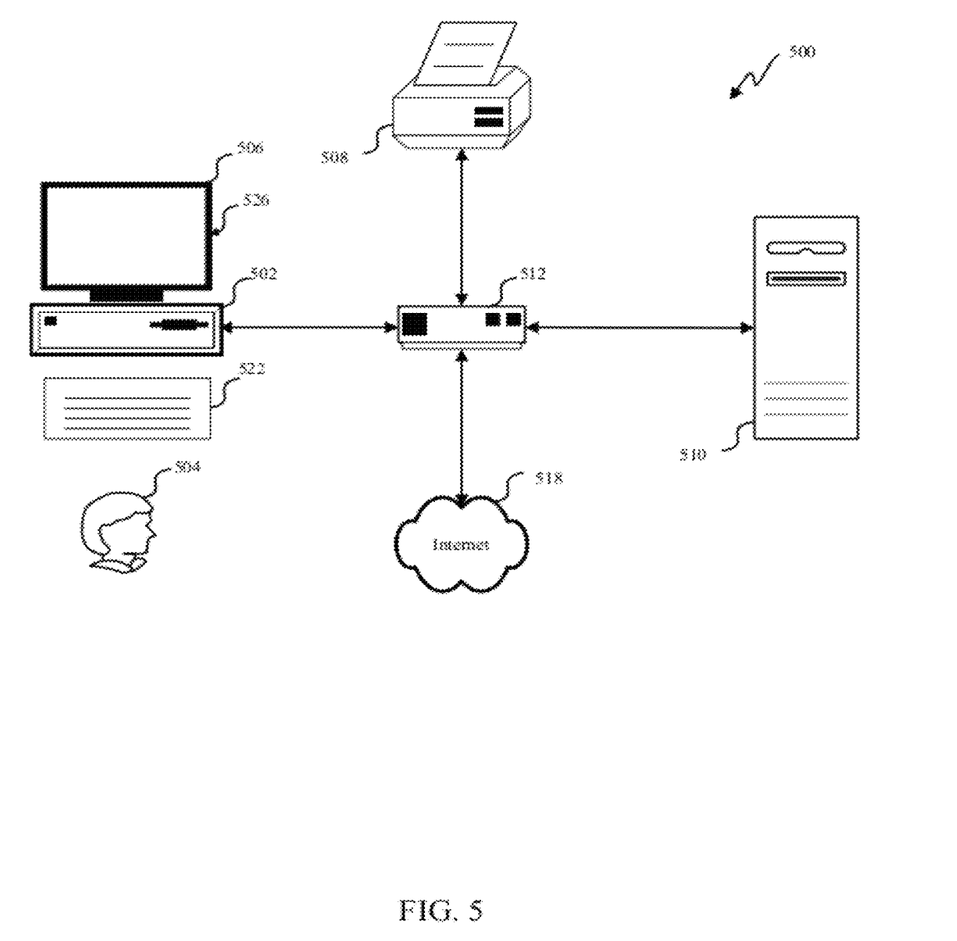
FIG. 5 depicts a block diagram of an embodiment of a CAD system, in accordance with various embodiments.

Referring next to FIG. 5, an exemplary environment with which embodiments may be implemented is shown with a computer aided design (CAD) system 500 that can be used by a designer 504 to design, for example, electronic circuits. The CAD system 500 can include a computer 502, keyboard 522, a network router 512, a printer 508, and a monitor 506. The monitor 506, processor 502 and keyboard 522 are part of a computer system 526, which can be a laptop computer, desktop computer, handheld computer, mainframe computer, etc. The monitor 506 can be a cathode ray tube (CRT), flat screen, etc.

A circuit designer 504 can input commands into the processor 502 using various input devices, such as a mouse, keyboard 522, track ball, touch screen, etc. If the CAD system 500 comprises a mainframe, a designer 504 can access the computer 502 using, for example, a terminal or terminal interface. Additionally, the computer system 526 may be connected to a printer 508 and a server 510 using a network router 512, which may connect to the Internet 518 or a WAN.

The server 510 may, for example, be used to store additional software programs and data. In one embodiment, software implementing the systems and methods described herein can be stored on a storage medium in the server 510. Thus, the software can be run from the storage medium in the server 510. In another embodiment, software implementing the systems and methods described herein can be stored on a storage medium in the computer 502. Thus, the software can be run from the storage medium in the computer system 526. Therefore, in this embodiment, the software can be used whether or not computer 502 is connected to network router 512. Printer 508 may be connected directly to computer 502, in which case, the computer system 526 can print whether or not it is connected to network router 512.

Figure 6:
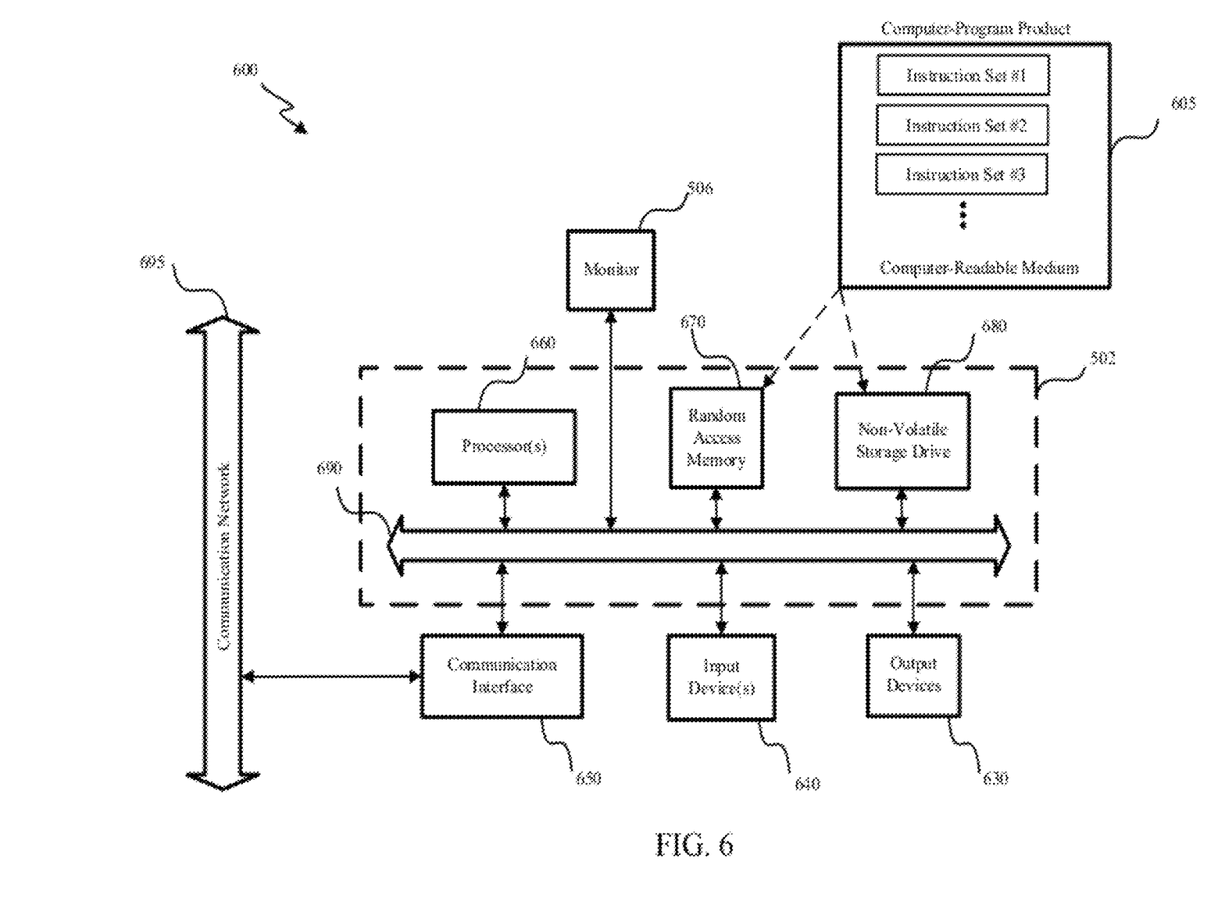
FIG. 6 depicts a block diagram of an embodiment of a special-purpose computer, in accordance with various embodiments.

With reference to FIG. 6, an embodiment of a special-purpose computer system 600 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 526, it is transformed into the special-purpose computer system 600 for CAD.

Special-purpose computer system 600 comprises a computer 502, a monitor 506 coupled to computer 502, one or more additional user output devices 630 (optional) coupled to computer 502, one or more user input devices 640 (e.g., keyboard, mouse, track ball, touch screen) coupled to computer 502, an optional communications interface 650 coupled to computer 502, a computer-program product 605 stored in a tangible computer-readable memory in computer 502. Computer-program product 605 directs system 600 to perform the above-described methods. Computer 502 may include one or more processors 660 that communicate with a number of peripheral devices via a bus subsystem 690. These peripheral devices may include user output device(s) 630, user input device(s) 640, communications interface 650, and a storage subsystem, such as random access memory (RAM) 670 and non-volatile storage drive 680 (e.g., disk drive, optical drive, solid state drive), which are forms of tangible computer-readable memory.

Computer-program product 605 may be stored in non-volatile storage drive 680 or another computer-readable medium accessible to computer 502 and loaded into memory 670. Each processor 660 may comprise a microprocessor, such as a microprocessor from Intel® or Advanced Micro Devices, Inc.®, or the like. To support computer-program product 605, the computer 502 runs an operating system that handles the communications of product 605 with the above-noted components, as well as the communications between the above-noted components in support of the computer-program product 605. Exemplary operating systems include Windows® or the like from Microsoft Corporation, Solaris® from Sun Microsystems, LINUX, UNIX, and the like.

User input devices 640 include all possible types of devices and mechanisms for inputting information to computer system 502. These may include a keyboard, a keypad, a mouse, a scanner, a digital drawing pad, a touch screen incorporated into the display, audio input devices such as voice recognition systems, microphones, and other types of input devices. In various embodiments, user input devices 640 are typically embodied as a computer mouse, a trackball, a track pad, a joystick, wireless remote, a drawing tablet, a voice command system. User input devices 640 typically allow a user to select objects, icons, text and the like that appear on the monitor 506 via a command such as a click of a button or the like. User output devices 630 include all possible types of devices and mechanisms for outputting information from computer 502. These may include a display (e.g., monitor 506), printers, non-visual displays such as audio output devices, etc.

Communications interface 650 provides an interface to other communication networks 695 and devices and may serve as an interface for receiving data from and transmitting data to other systems, WANs and/or the Internet 518. Embodiments of communications interface 650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 650 may be coupled to a computer network, to a FireWire® bus, or the like. In other embodiments, communications interface 650 may be physically integrated on the motherboard of computer 502, and/or may be a software program, or the like.

RAM 670 and non-volatile storage drive 680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 670 and non-volatile storage drive 680 may be configured to store the basic programming and data constructs that provide the functionality of various embodiments, as described above.

Software instruction sets that provide the functionality of the present invention may be stored in RAM 670 and non-volatile storage drive 680. These instruction sets or codes may be executed by the processor(s) 660. RAM 670 and non-volatile storage drive 680 may also provide a repository for storing data and data structures used in accordance with the present invention. RAM 670 and non-volatile storage drive 680 may include a number of memories including a main random access memory (RAM) for storage of instructions and data during program execution and a read-only memory (ROM) in which fixed instructions are stored. RAM 670 and non-volatile storage drive 680 may include a file storage subsystem providing persistent (non-volatile) storage for program and/or data files. RAM 670 and non-volatile storage drive 680 may also include removable storage systems, such as removable flash memory.

Bus subsystem 690 provides a mechanism for letting the various components and subsystems of computer 502 communicate with each other as intended. Although bus subsystem 690 is shown schematically as a single bus, alternative embodiments of the bus subsystem may utilize multiple busses or communication paths within the computer 502.

Some embodiments may include a system, such as systems 500 or 600, for simulating phase noise for an oscillator circuit. The system may include a storage medium. The system may include a processor coupled with the storage medium. The processor may be configured to simulating phase noise for an oscillator circuit by a configuration to: provide an oscillator circuit description; determining a time-domain representation of a small signal phase noise of the oscillator circuit description; generate a shooting Newton matrix representation of the time-domain representation of the small signal phase noise; augment the shooting Newton matrix representation to include a phase-shift factor and a pinning equation; and/or solve the augmented shooting Newton matrix representation to determine a signal output of the oscillator circuit.

In some embodiments of a system for simulating phase noise for an oscillator circuit, the pinning equation may pin the phase of a large signal steady state solution of the oscillator circuit. Some embodiments may further separate the matrix representation into a phase modulation portion and an amplitude modulation portion. Some embodiments may further include solving the phase modulation portion and the amplitude modulation portion separately.

Some embodiments may further include applying an iterative recycle technique to solve at least a portion of the matrix representation. The iterative recycling technique may be an Arnoldi-vector recycle technique.

In some embodiments of a system for simulating phase noise for an oscillator circuit, the oscillator circuit may include a large time-constant element. The large time-constant element may have time-constant value that is more than 100 times larger than the oscillating periods of the oscillator. The large time-constant element may be a voltage supply.

Some embodiments may include a machine-readable storage medium including executable instructions for simulating phase noise for an oscillator circuit as shown in different aspects of systems 500 or 600. The executable instructions may include code for: providing an oscillator circuit description; determining a time-domain representation of a small signal phase noise of the oscillator circuit description; generating a shooting Newton matrix representation of the time-domain representation of the small signal phase noise; augmenting the shooting Newton matrix representation to include a phase-shift factor and a pinning equation; and/or solving the augmented shooting Newton matrix representation to determine a signal output of the oscillator circuit.

In some embodiments of a machine-readable storage medium including executable instructions for simulating phase noise for an oscillator circuit, the pinning equation may pin the phase of a large signal steady state solution of the oscillator circuit. Some embodiments may further separate the matrix representation into a phase modulation portion and an amplitude modulation portion. Some embodiments may further include solving the phase modulation portion and the amplitude modulation portion separately. Some embodiments may further include applying an iterative recycle technique to solve at least a portion of the matrix representation. The iterative recycling technique may be an Arnoldi-vector recycle technique.

In some embodiments of a machine-readable storage medium including executable instructions for simulating phase noise for an oscillator circuit, the oscillator circuit may include a large time-constant element. The large time-constant element may have time-constant value that is more than 100 times larger than the oscillating periods of the oscillator. The large time-constant element may be a voltage supply.

While the principles of the disclosure have been described above in connection with specific apparatuses, systems, and methods, it is to be clearly understood that this description is made only by way of example and not as limitation on the scope of the disclosure.

What is claimed is:

1. A method of simulating phase noise for an oscillator circuit, the method comprising:
   providing an oscillator circuit description;
   determining a time-domain representation of a small signal phase noise of the oscillator circuit description;
   generating a shooting Newton matrix representation of the time-domain representation of the small signal phase noise;
   augmenting the shooting Newton matrix representation to include a phase-shift factor and a pinning equation, wherein the pinning equation pins a phase of a large signal steady state solution of the oscillator circuit; and
   solving the augmented shooting Newton matrix representation to determine a signal output of the oscillator circuit.

2. The method of simulating phase noise for an oscillator circuit of claim 1, further comprising separating the matrix representation into a phase modulation portion and an amplitude modulation portion.

3. The method of simulating phase noise for an oscillator circuit of claim 2, further comprising solving the phase modulation portion and the amplitude modulation portion separately.

4. The method of simulating phase noise for an oscillator circuit of claim 1, further comprising applying an iterative recycle technique to solve at least a portion of the matrix representation.

5. The method of simulating phase noise for an oscillator circuit of claim 4, wherein the iterative recycling technique is an Arnoldi-vector recycle technique.

6. The method of simulating phase noise for an oscillator circuit of claim 1, wherein the oscillator circuit includes a large time-constant element.

7. The method of simulating phase noise for an oscillator circuit of claim 6, wherein the large time-constant element has a time-constant value at least 100 times larger than an oscillating period of an oscillator of the oscillator circuit.

8. The method of simulating phase noise for an oscillator circuit of claim 6, wherein the large time-constant element is a voltage supply.

9. A system for simulating phase noise for an oscillator circuit, the system comprising:
   a non-transitory storage medium;
   a processor coupled with the storage medium, the processor configured to simulating phase noise for an oscillator circuit by a configuration to:
   provide an oscillator circuit description;
   determine a time-domain representation of a small signal phase noise of the oscillator circuit description;
   generate a shooting Newton matrix representation of the time-domain representation of the small signal phase noise;
   augment the shooting Newton matrix representation to include a phase-shift factor and a pinning equation, wherein the pinning equation pins a phase of a large signal steady state solution of the oscillator circuit; and
   solve the augmented shooting Newton matrix representation to determine a signal output of the oscillator circuit.

10. The system for simulating phase noise for an oscillator circuit of claim 9, wherein the configuration further comprises separating the matrix representation into a phase modulation portion and an amplitude modulation portion.

11. The system for simulating phase noise for an oscillator circuit of claim 10, the configuration further comprises solving the phase modulation portion and the amplitude modulation portion separately.

12. The system for simulating phase noise for an oscillator circuit of claim 9, wherein the configuration further comprises applying an iterative recycle technique to solve at least a portion of the matrix representation.

13. The system for simulating phase noise for an oscillator circuit of claim 12, wherein the iterative recycling technique is an Arnoldi-vector recycle technique.

14. The system for simulating phase noise for an oscillator circuit of claim 9, wherein the oscillator circuit includes a large time-constant element.

15. The system for simulating phase noise for an oscillator circuit of claim 14, wherein the large time-constant element has a time-constant value at least 100 times larger than an oscillating period of an oscillator of the oscillator circuit.

16. The system for simulating phase noise for an oscillator circuit of claim 14, wherein the large time-constant element is a voltage supply.

17. A non-transitory machine-readable storage medium comprising executable instructions for simulating phase noise for an oscillator circuit, the executable instructions comprising code for:

provid ing an oscillator circuit description;

determining a time-domain representation of a small signal phase noise of the oscillator circuit description;

generating a shooting Newton matrix representation of the time-domain representation of the small signal phase noise;

augmenting the shooting Newton matrix representation to include a phase-shift factor and an equation, wherein the equation is a pinning equation which pins a phase of a large signal steady state solution of the oscillator circuit; and solving the augmented shooting Newton matrix representation to determine a signal output of the oscillator circuit.

18. The non-transitory machine-readable storage medium comprising executable instructions for simulating phase noise for an oscillator circuit of claim 17, wherein the code further comprises code for separating the matrix representation into a phase modulation portion and an amplitude modulation portion.

19. The non-transitory machine-readable storage medium comprising executable instructions for simulating phase noise for an oscillator circuit of claim 17, wherein the code further comprises code for solving the phase modulation portion and the amplitude modulation portion separately.

20. The non-transitory machine-readable storage medium comprising executable instructions for simulating phase noise for an oscillator circuit of claim 17, wherein the code further comprising code for applying an iterative recycle technique to solve at least a portion of the matrix representation.

21. The non-transitory machine-readable storage medium comprising executable instructions for simulating phase noise for an oscillator circuit of claim 20, wherein the iterative recycling technique is an Arnoldi-vector recycle technique.

22. The non-transitory machine-readable storage medium comprising executable instructions for simulating phase noise for an oscillator circuit of claim 17, wherein the oscillator circuit includes a large time-constant element.

23. The non-transitory machine-readable storage medium comprising executable instructions for simulating phase noise for an oscillator circuit of claim 22, wherein the large time-constant element has a time-constant value at least 100 times larger than an oscillating period of an oscillator of the oscillator circuit.

24. The non-transitory machine-readable storage medium comprising executable instructions for simulating phase noise for an oscillator circuit of claim 22, wherein the large time-constant element is a voltage supply.

* * * * *